Oct. 31, 1933. G. EGLOFF ET AL 1,932,726
LINING FOR VESSELS HOLDING OIL
Filed July 18, 1929
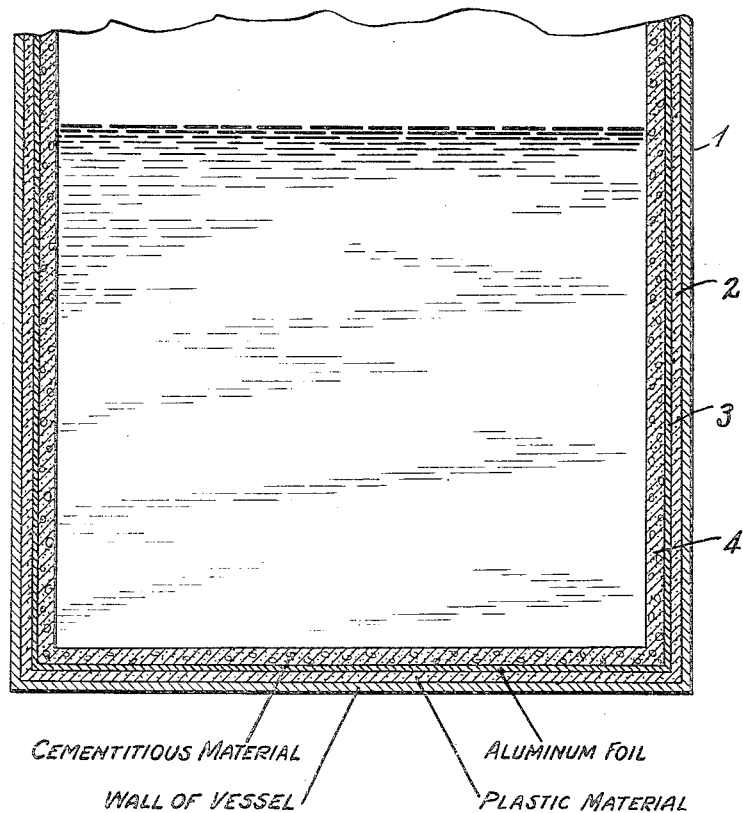
Inventors
Gustav Egloff and
Charles D. Lowry, Jr.
By Frank L. Belknap
Attorney Patented Oct. 31, 1933

1,932,726

UNITED STATES PATENT OFFICE 1,932,726

LINING FOR VESSELS HOLDING OIL

Gustav Egloff and Charles D. Lowry, Jr., Chicago, Ill., assignors to Universal Oil Products Company, Chicago, Ill., a corporation of South Dakota Application July 18, 1929. Serial No. 379,198

3 Claims. (Cl. 220—63)

This invention has for its object the provision of an improved corrosion resisting lining for oil retaining vessels, especially those employed in cracking processes. In such processes the oil retaining chambers are, in many instances, rapidly corroded, due to the content of corrosive substances in the oil treated, and thereby rendered unsafe for operation under the temperature and pressure conditions used for cracking oil. It is one object of this invention to reduce this danger. The economic losses due to corrosion of oil treating equipment are enormous, and to the limitation of these losses the present invention is also directed.

It has heretofore been proposed to line oil retaining vessels with certain types of corrosive resisting materials. Some success has been obtained in the use of cementituous liners, in particular by the use of the so-called "Ganister" lining. The materials used in the making of the Ganister lining are Portland cement, sand, and pulverized firebrick. The lining is affixed to the walls of the oil retaining vessels by spraying or otherwise, and sets to a solid mass. It may be made with or without the use of reinforcing elements. When fully hardened it is concrete-like in structure and durable because composed entirely of non-corroding materials.

These Ganister liners have the disadvantage that, over prolonged periods of use, they disintegrate and are gradually destroyed. The disintegration of these liners is not uniform over their entire surface, and, therefore, instances occur, at some points in the surface of an oil retaining vessels, where the Ganister lining no longer offers any protection to the steel wall, whereas, throughout the remainder of the vessel, the lining is substantially intact.

Specifically, the present invention contemplates the provision of a lining for oil retaining vessels, which will possess the desirable protective characteristics of the so-called Ganister lining, while at the same time it will be of materially longer life, and afford greater protection to the steel walls of the vessels to which it is supplied.

The novel coating which we have devised is made up of three layers: an inner layer of bituminous or pitchy material firmly attached to the inner wall of an oil retaining vessel, a thin layer of aluminum upon this, and a layer of cementitious material similar to the Ganister lining applied to the aluminum, with its exposed surface toward the interior of the oil retaining vessel.

In the practice of our invention, upon the inner wall of a steel retort, still, or tank for holding oil, we preferably initially apply an adhesive coating of pitch or asphalt-like material, which may have a melting point of approximately 140 degrees F. Upon this adhesive coating, which is applied in a molten condition, and prior to its solidification, we overlay a very thin coating of aluminum in the form of foil of the order of about 2/1000 inch in thickness. The aluminum coating may be applied in any manner, so long as an impervious aluminum layer is formed on the inner surface of the pitchy material applied to the steel vessel. Usually the aluminum will simply be taken from a roll of foil and pressed against the soft tar. We next apply to the aluminum covering, a cementitious material, formed from non-corroding components, in a layer of sufficient thickness to insure its retention on the vessel wall and give it protecting properties. This latter coating will both be of protective power itself and will insure retention of the aluminum coating in contact with the pitch covered wall. The cementitious layer may be the cement-sand-firebrick mixture used in forming the Ganister lining, or may be composed of any other similar materials capable of withstanding the conditions under which the vessel will be used.

By forming a vessel lining in the manner above described, we are able to employ a cementitious coating of less thickness than has heretofore been required to protect steel vessel walls. Due to the employment of the impervious film or coating of aluminum the steel wall is protected throughout its entire area for a very long time even though the cementitious material may at some points in the vessel decompose or disintegrate to an extent which but for the aluminum layer would permit corrosion of the vessel wall.

It will be understood that the adhesive coating initially applied to the interior wall of the vessels is primarily employed for the purpose of retaining the imperforate aluminum layer during the application of the cementitious material. The latter may be applied by suitable spraying means, and may or may not be held in position by a bonding instrumentality associated with the wall of the vessel. When cracking stills are lined in this way and brought to operating temperatures, the pitch or asphalt layer of the lining will be softened by the heat. If the lining is properly built, the asphaltic material will be kept in place by the aluminum and cementitious layers, so that it cannot flow, and will harden into a durable layer of coky material entirely satisfactory as a component of the liner.

Due to the tensile strength of the aluminum foil or coating it is not readily ruptured or in any way injured, and by reason of its elasticity it readily conforms to the wall of the vessel, so that in the finished lining the cementitious material is backed throughout its entire extent, by the impervious non-corrosive aluminum layer.

From the foregoing it will be appreciated that we have provided a corrosion-resisting liner, which may be economically applied, and which will be of long life due to the fact that the vessel is protected even upon partial disintegration of the cementitious material.

The use of this liner will greatly decrease the losses occasioned by corrosion in oil retaining vessels of all sorts, and in particular will insure the margin of safety necessary for the operation of high pressure oil cracking apparatus over long periods of time.

The accompanying drawing is a partial sectional view of an oil retaining vessel provided with the liner of our invention. At 1 is shown the outer wall of the vessel on the surface of which is secured, by means of plastic material 2, a thin layer of aluminum foil 3 to which is applied a layer 4 of corrosion-resisting cementitious material.

We claim as our invention:

1. A method of protecting oil retaining vessels employed in cracking against corrosion, comprising initially coating the interior wall of the vessel with an adhesive material, then prior to solidification of the adhesive material, bonding therewith a thin imperforate layer of aluminum, and finally applying a coating of cementitious material of corrosion-resisting character completely covering the aluminum layer to retain the aluminum layer in position.

2. An oil retaining vessel adapted for use in high temperature processes, comprising a steel wall, a thin layer of aluminum bonded thereto by a plastic material, and a layer of cementitious material of corrosion-resisting character deposited upon said aluminum layer.

3. An oil retaining vessel having a layer of aluminum attached to the inner wall thereof by a plastic material and a layer of cementitious corrosion-resisting material upon the aluminum layer.

GUSTAV EGLOFF.
CHARLES D. LOWRY, Jr.